US008015922B2

(12) United States Patent
Fu

(10) Patent No.: US 8,015,922 B2
(45) Date of Patent: Sep. 13, 2011

(54) CONTROL SYSTEM FOR RIGHT CIRCULAR CYLINDER BODIES

(75) Inventor: Jyun-Horng Fu, Centreville, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 210 days.

(21) Appl. No.: 12/399,946

(22) Filed: Mar. 7, 2009

(65) Prior Publication Data

US 2010/0225256 A1 Sep. 9, 2010

(51) Int. Cl.
*F42B 19/01* (2006.01)
*H02K 41/035* (2006.01)

(52) U.S. Cl. .............. 102/399; 89/5; 114/23; 310/12.04

(58) Field of Classification Search .................. 102/399; 114/20.1, 23; 89/1.819, 5, 1.809; 318/162; 307/104; 310/12.04
See application file for complete search history.

(56) References Cited

U.S. PATENT DOCUMENTS

| | | | | | |
|---|---|---|---|---|---|
| 1,346,743 | A | * | 7/1920 | Fink | 405/188 |
| 2,382,058 | A | * | 8/1945 | Hull | 114/23 |
| 2,403,064 | A | * | 7/1946 | Elmer et al. | 114/23 |
| 2,414,928 | A | * | 1/1947 | Chilton | 114/20.1 |
| 2,432,869 | A | * | 12/1947 | Elmer | 114/23 |
| 2,520,433 | A | * | 8/1950 | Robinson | 244/3.16 |
| 2,822,755 | A | * | 2/1958 | Edwards et al. | 244/3.22 |
| 3,010,677 | A | * | 11/1961 | Guthrie et al. | 244/3.16 |
| 4,429,652 | A | * | 2/1984 | Stol | 114/20.1 |
| 4,601,251 | A | * | 7/1986 | Wisseroth | 114/23 |
| 5,729,067 | A | * | 3/1998 | Janutka | 310/135 |
| 2006/0181158 | A1 | * | 8/2006 | Tajima et al. | 310/12 |
| 2008/0001483 | A1 | * | 1/2008 | Kitamura et al. | 310/12 |

* cited by examiner

*Primary Examiner* — Bret Hayes
(74) *Attorney, Agent, or Firm* — DeMont & Breyer, LLC

(57) ABSTRACT

A technique for controlling the pitch of a supercavitating projectile is disclosed. For example, the illustrative embodiment controls the pitch of a supercavitating projectile by shifting its center of gravity. The center of gravity of the projectile is shifted by moving a ferromagnetic mass inside the projectile forward or backward, depending on the desired pitch. In some embodiments of the present invention, the position of the ferromagnetic mass is directed by a controller that has a predetermined trajectory stored in its memory.

12 Claims, 3 Drawing Sheets

Supercavitating Underwater Projectile 100

CONTROL SYSTEM FOR RIGHT CIRCULAR CYLINDER BODIES

FIELD OF THE INVENTION

The present invention relates to underwater projectiles in general, and, more particularly, to supercavitating projectiles.

BACKGROUND OF THE INVENTION

A supercavitating underwater projectile can achieve speeds of 150 knots, and, therefore, it is especially useful in naval applications. A supercavitating underwater projectile achieves these speeds because it comprises a blunt nose known as a "cavitator." As the projectile travels through the water, the cavitator contacts the water in such a way as to create many small air bubbles. The small air bubbles then coalesce into one big air bubble that is large enough to completely encompass the projectile. The effect is that the projectile is traveling inside a giant air bubble.

SUMMARY OF THE INVENTION

Controlling the trajectory of supercavitating projectiles is a challenging task because supercavitating projectiles travel inside a gaseous bubble underwater, and, therefore, the conventional mechanism for controlling projectiles in air and projectiles in water are often unsatisfactory. Therefore a need exists for a simple and dependable way for controlling the trajectory of a supercavitating projectile as it travels.

The present invention provides a technique for controlling the pitch of a supercavitating projectile without some of the costs and disadvantages for doing so in the prior art. For example, the illustrative embodiment controls the pitch of a supercavitating projectile by shifting its center of gravity. The center of gravity of the projectile is shifted by moving a ferromagnetic mass inside the projectile forward or backward, depending on the desired pitch. In some embodiments of the present invention, the position of the ferromagnetic mass is directed by a controller that has a predetermined trajectory stored in its memory.

The illustrative embodiment has a roll axis and comprises: a ferromagnetic mass that has a center of gravity on the roll axis; a first spring connected to the ferromagnetic mass; and a first magnet for displacing the ferromagnetic mass along the roll axis.

DETAILED DESCRIPTION

Figure 1:
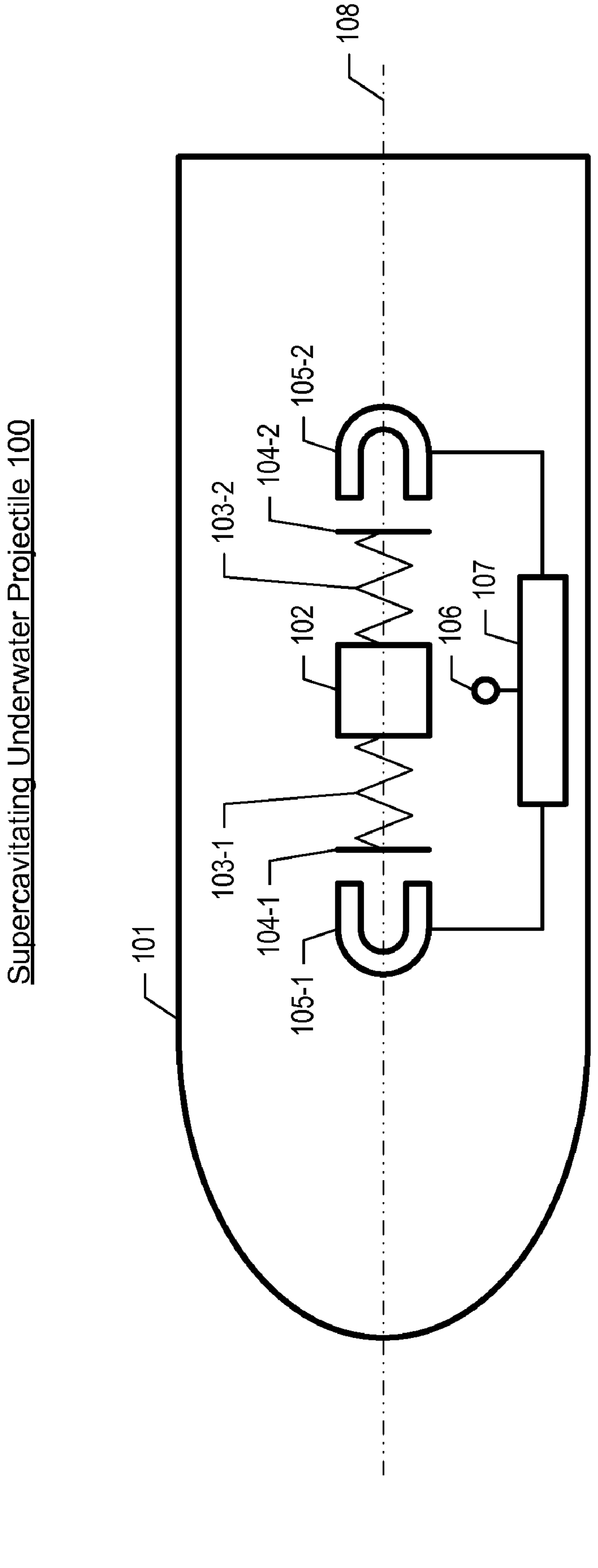
FIG. 1 depicts a schematic drawing of the salient components of supercavitating underwater projectile 100 in accordance with the illustrative embodiment of the present invention.

FIG. 1 depicts a schematic drawing of the salient components of supercavitating underwater projectile 100 in accordance with the illustrative embodiment of the present invention. Supercavitating underwater projectile 100 comprises: projectile body 101, ferromagnetic mass 102, springs 103-1 and 103-2, backstops 104-1 and 104-2, magnets 105-1 and 105-2, sensor 106, controller 107, and longitudinal roll axis 108.

Projectile body 101 is a non-explosive, propelled object, such as a bullet, for imparting kinetic energy to a target (not shown). It will be clear to those skilled in the art, after reading this disclosure, how to make and use alternative embodiments of the present invention in which projectile body 101 is an explosive object. Furthermore, it will be clear to those skilled in the art, after reading this disclosure, how to make and use alternative embodiments of the present invention in which projectile body 101 is a self-propelled object, such as a missile, rocket, or torpedo.

Ferromagnetic mass 102 is an iron block that is connected to springs 103-1 and 103-2. The movement of ferromagnetic mass 102 is constrained so that it can only move between backstops 104-1 and 104-2. At each position between backstops 104-1 and 104-2, the center of mass of ferromagnetic mass 102 is on longitudinal roll axis 108. It will be clear to those skilled in the art how to make and use ferromagnetic mass 102.

In accordance with the illustrative embodiment, ferromagnetic mass 102 is centered on longitudinal roll axis 108, but it would be clear to those skilled in the art, after reading this disclosure, how to make and use alternative embodiments in which ferromagnetic mass 102 is positioned elsewhere inside projectile body 101. Although ferromagnetic mass 102 has one degree of freedom of movement, it would be clear to those skilled in the art, after reading this disclosure, how to make and use alternative embodiments in which ferromagnetic mass 102 has any number of degrees of freedom of movement.

Spring 103-1 is a helical spring between backstop 104-1 and ferromagnetic mass 102. The restoring force of spring 103-1 is co-linear with longitudinal roll axis 108. Spring 103-2 is a helical spring between backstop 104-2 and ferromagnetic mass 102. The restoring force of spring 103-2 is co-linear with longitudinal roll axis 108.

Although springs 103-1 and 103-2 are helical, it will be clear to those skilled in the art, after reading this disclosure, how to make and use alternative embodiments of the present invention in which one or both of springs 103-1 and 103-2 are another type of spring, such as for example and without limitation, a leaf-spring, a volute spring, etc. In accordance with the illustrative embodiment, each of springs 103-1 and 103-2 are a single spring, but it will be clear to those skilled in the art, after reading this disclosure, how to make and use alternative embodiments in which one or both of springs 103-1 and 103-2 comprises a plurality of springs or function in parallel with a damper (e.g., hydraulic piston, etc.).

In accordance with the illustrative embodiment, springs 103-1 and 103-2 are identical, but it will be clear to those skilled in the art, after reading this disclosure, how to make and use alternative embodiments in which springs 103-1 and 103-2 are different (e.g., have different spring stiffness coefficients, are made of different materials, etc.).

Magnet 105-1 is an electromagnetic that generates an attractive magnetic force on ferromagnetic mass 102. The direction of the magnetic force is co-linear with the longitudinal roll axis 108, and the magnitude of the force varies under the direction of controller 107. Magnet 105-2 is an electromagnetic that generates an attractive magnetic force on ferromagnetic mass 102. The direction of the magnetic force is also co-linear with the longitudinal roll axis 108, and the magnitude of the force also varies under the direction of controller 107.

Sensor 106 is a device for measuring the speed of projectile 101 and conveying an indication of that speed to controller 107. In accordance with the illustrative embodiment sensor 101 measures the speed of projectile 100, however it will be clear to those skilled in the art, after reading this disclosure, how to make and use alternative embodiments in which sensor 106 senses another physical characteristic such as for example and without limitation, acceleration, pitch, yaw, tilt, roll, temperature, humidity, radiation, etc. Although, the illustrative embodiment comprises only one sensor, it will be clear to those skilled in the art, after reading this disclosure, how to make and use alternative embodiments in which multiple sensors are used.

Controller 107 is a processor that receives input from sensor 106 and generates signals to direct magnet 105-1 and 105-2. In particular, controller 107 controls magnets 105-1 and 105-2 to move ferromagnetic mass 102, which alters the center of gravity of projectile 100, to achieve a desired pitch. It will be clear to those skilled in the art, after reading this disclosure, how to make and use controller 107 to control magnets 105-1 and 105-2.

Figure 2:
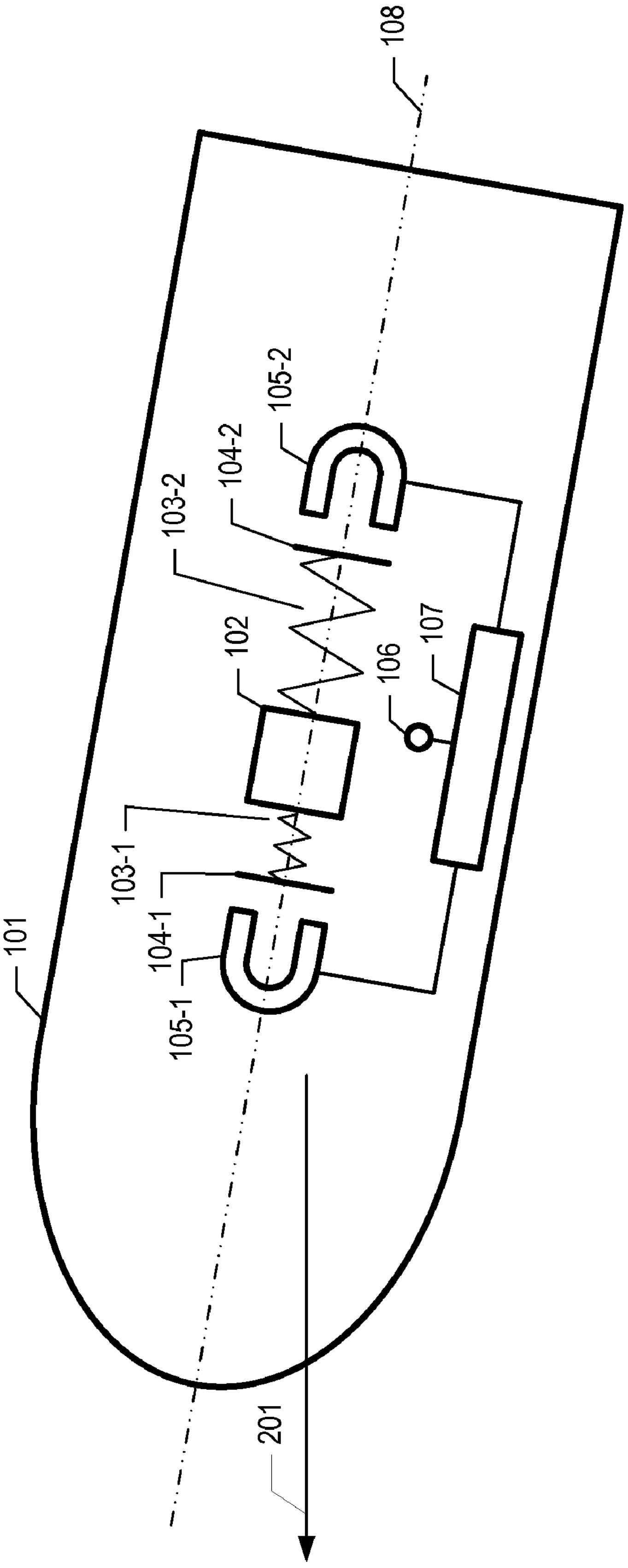
FIG. 2 depicts a schematic diagram of the salient components of supercavitating underwater projectile 100 as it travels in direction 201 that is different from its longitudinal roll axis 108 (i.e., supercavitating underwater projectile 100 is pitching up).

FIG. 2 depicts a schematic diagram of the salient components of supercavitating underwater projectile 100 as it travels in direction 201 that is different from its longitudinal roll axis 108 (i.e., supercavitating underwater projectile 100 is pitching up). In this case, controller 107 has directed magnet 105-1 to move ferromagnetic mass 102 forward to restore the longitudinal roll axis to the direction of travel.

Figure 3:
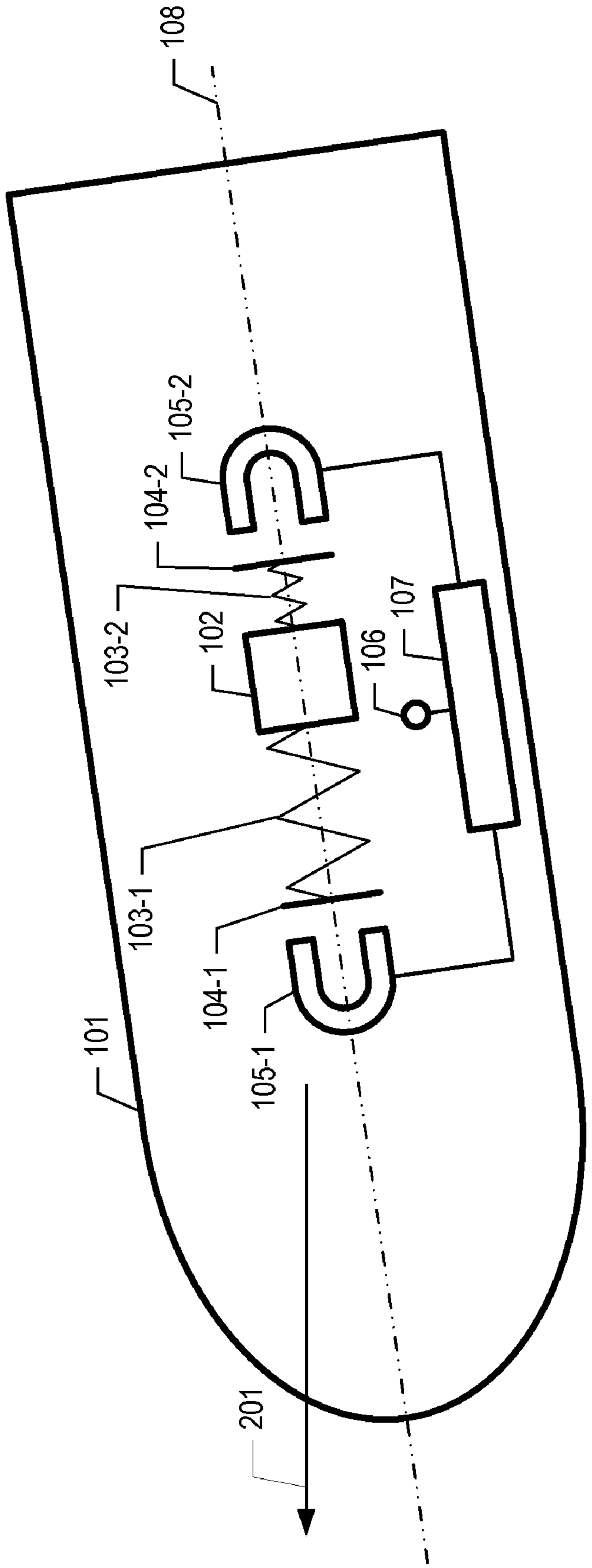
FIG. 3 depicts a schematic diagram of the salient components of supercavitating underwater projectile 100 as it travels in direction 201 that is different from its longitudinal roll axis 108 (i.e., supercavitating underwater projectile 100 is pitching down).

FIG. 3 depicts a schematic diagram of the salient components of supercavitating underwater projectile 100 as it travels in direction 201 that is different from its longitudinal roll axis 108 (i.e., supercavitating underwater projectile 100 is pitching down). In this case, controller 107 has directed magnet 105-2 to move ferromagnetic mass 102 aft to restore the longitudinal roll axis to the direction of travel.

What is claimed is:

1. A projectile having a longitudinal roll axis, the projectile comprising:

a ferromagnetic mass that has a center of gravity on the longitudinal roll axis;

a first spring connected to the ferromagnetic mass;

a second spring connected to the ferromagnetic mass;

a first electromagnet for displacing the ferromagnetic mass along the longitudinal roll axis;

a second electromagnet for displacing the ferromagnetic mass along the longitudinal roll axis in a direction opposed by the first magnet;

a sensor for measuring a characteristic of the projectile; and a controller for controlling the first magnet and the second magnet based on signal from the sensor;

wherein the controller alters the center of gravity of the projectile by causing at least one of the first electromagnet and second electromagnet to move the ferromagnetic mass along the longitudinal roll axis.

2. The projectile of claim 1 wherein the characteristic is pitch.

3. The projectile of claim 1 wherein the characteristic is roll.

4. The projectile of claim 1 wherein the characteristic is yaw.

5. The projectile of claim 1 wherein the characteristic is tilt.

6. The projectile of claim 1 wherein the characteristic is acceleration.

7. A projectile having a longitudinal roll axis, the projectile comprising:

a ferromagnetic mass;

an electromagnet for displacing the ferromagnetic mass;

a spring for imparting a force on the ferromagnetic mass;

a sensor for measuring a characteristic of the projectile; and a controller for controlling the first electromagnet based on signal from the sensor;

wherein the controller alters the center of gravity of the projectile by causing the electromagnet to move the ferromagnetic mass along the longitudinal roll axis in a direction that is opposed by the force.

8. The projectile of claim 7 wherein the characteristic is pitch.

9. The projectile of claim 7 wherein the characteristic is roll.

10. The projectile of claim 7 wherein the characteristic is yaw.

11. The projectile of claim 7 wherein the characteristic is tilt.

12. The projectile of claim 7 wherein the characteristic is acceleration.

* * * * *